United States Patent [19]

Weinstein

[11] Patent Number: 5,170,172

[45] Date of Patent: * Dec. 8, 1992

[54] ELECTRONIC ASSEMBLY FOR RANGE FINDING USING RADIO WAVE SIGNAL STRENGTH

[75] Inventor: Lee D. Weinstein, Houston, Tex.

[73] Assignee: Torrington Products Venture, Inc., New Hartford, Conn.

[ * ] Notice: The portion of the term of this patent subsequent to Nov. 26, 2008 has been disclaimed.

[21] Appl. No.: 795,195

[22] Filed: Nov. 18, 1991

Related U.S. Application Data

[63] Continuation-in-part of Ser. No. 625,313, Dec. 10, 1990, Pat. No. 5,067,441.

[51] Int. Cl.⁵ .................... G01S 3/02; G08B 23/00
[52] U.S. Cl. ........................ 342/458; 340/573
[58] Field of Search ............. 342/385, 386, 465, 463, 342/27, 458; 340/552, 564, 573; 119/29

[56] References Cited

U.S. PATENT DOCUMENTS

| | | | |
|---|---|---|---|
| 2,423,083 | 7/1947 | Daubaras | 343/842 |
| 2,485,654 | 10/1949 | Pickles | 343/842 |
| 3,093,732 | 6/1963 | Clark | 328/144 |
| 3,753,421 | 8/1973 | Peck | 119/106 |
| 3,777,712 | 12/1973 | Gardner et al. | 119/29 |
| 3,798,647 | 3/1974 | Bailey | 342/458 |
| 3,980,051 | 9/1976 | Fury | 119/29 |
| 4,136,338 | 1/1979 | Antenore | 340/551 |
| 4,335,682 | 6/1982 | Gonda et al. | 119/29 |
| 4,593,273 | 6/1986 | Narcisse | 340/539 |
| 4,675,656 | 6/1987 | Narcisse | 340/539 |
| 4,733,633 | 3/1988 | Yarnall, Sr. et al. | 119/29 |
| 4,737,794 | 4/1988 | Jones | 342/448 |
| 4,745,882 | 5/1988 | Yarnall, Sr. et al. | 119/29 |
| 4,766,847 | 8/1988 | Venczel et al. | 119/29 |
| 4,777,478 | 10/1988 | Hirsch et al. | 340/573 |
| 4,785,291 | 11/1988 | Hawthorne | 340/573 |
| 4,814,751 | 3/1989 | Hawkins et al. | 340/573 |
| 4,871,997 | 10/1989 | Adriaenssens et al. | 340/539 |
| 4,898,120 | 2/1990 | Brose | 119/29 |
| 4,967,695 | 11/1990 | Guinta | 119/29 |
| 5,067,441 | 11/1991 | Weinstein | 119/29 |

OTHER PUBLICATIONS

BI 3,753,421 Peck Reexamination Certificate, Sep. 25, 1984.

Primary Examiner—Gregory C. Issing

[57] ABSTRACT

A radio range finding system includes a radio frequency transmitter adapted to be located adjacent an area in which distance is to be monitored, a transmitting antenna, and a receiver unit. The receiver unit has a multiplicity of radio signal receivers each having a highly directional receiving antenna with the receiving antennae of the multiplicity of receivers having their axes of maximum sensitivity oriented in different directions, and an analyzer for determining a composite of the field strengths of the radio signals received by the receiving antennae, and providing an output indicative of the composite field strength. The receiver may detect when the composite field strength at the receiving antennae fails below predetermined values, and generate a signal at that time. The vector sum of the field strengths of the radio signals are derived from the square root of the sum of the squares of the field strengths of the several signals. The field strength signals are multiplexed and converted to a DC voltage by an RMS to DC converter. The transmit antenna is a loop comprising one or more turns shielded by two partial spaced apart shields, each connected only to the shield of the antenna cable at its junction to the loop.

26 Claims, 4 Drawing Sheets

ELECTRONIC ASSEMBLY FOR RANGE FINDING USING RADIO WAVE SIGNAL STRENGTH

CROSS REFERENCE TO RELATED APPLICATION

The present application is a continuation-in-part of application Ser. No. 07/625,313 filed Dec. 10, 1990, which matured into U.S. Pat. No. 5,067,441 granted Nov. 26, 1991 entitled "Electronic Assembly for Restricting Animals to Defined Areas".

BACKGROUND OF THE INVENTION

The present invention relates to radio range-finding systems and, more particularly, to such systems which utilize field strength measurement to determine the distance from the transmitter to the receiver.

Over the years, a number of techniques have been developed and utilized to measure distance electromagnetically. These include phase, timing, and field strength measurements of radio frequency signals. Phase measurement techniques have been well utilized in navigation systems such as LORAN. Although both phase and time of arrival systems work well for far field measurements, they tend to be relatively complex and therefore costly.

Field strength measurement has been crudely utilized in applications such as "child minding"; a child carries a receiver or transmitter and a cooperating transmitter or receiver is placed at a location near which the child should stay When the distance between the transmitter and receiver exceeds some predetermined value, the field strength at the receiver falls below a predetermined threshold value, and an alarm or some suitable output is actuated. Such field strength based systems are attractive because of their low cost, but they have suffered from poor repeatability and poor accuracy due to the fact that the field strength is influenced by many factors other than distance. Included in these factors are intervening objects, and changing geometry of the transmitting and/or receiving antenna.

It is an object of the present invention to provide a novel and relatively economical radio range finding system based on signal field strength measurement.

It is also an object to provide such a system which exhibits a high level of accuracy and repeatability.

Another object is to provide such a system in which the transmitter and receiver may be fabricated readily from commercially available components and in a relatively miniaturized form.

Still another object is to provide a system which is relatively inexpensive, reliable in performance, and relatively long lived.

SUMMARY OF THE INVENTION

It has now been found that the foregoing and related objects may be readily attained in a radio range finding system comprising a radio frequency transmitter for generating radio signals and which is adapted to be disposed in or adjacent an area in which distance is to be monitored. A transmitting antenna is operatively connected to the transmitter for radiating the radio frequency signals generated by the transmitter.

A receiver unit which is adapted to be disposed within the area comprises (i) a multiplicity of radio signal receivers each having a receiving antenna with the receiving antennae of the multiplicity of receivers having their axes of maximum sensitivity oriented in different directions; (ii) means for deriving a composite field strength based upon the field strengths of the radio signals received by the receiving antennae; and (iii) means for providing an output indication based upon the composite field strength of the signals detected by the receiving antennae.

In one embodiment, the output indication means provides an output which varies with the strength of the composite field strength; in another the output is an audible signal. The receiver unit may also include means for detecting when the composite field strength falls below a predetermined value, and the output indication means in the receiver unit may be responsive thereto to generate a perceptible signal.

Preferably, there are at least three receivers in the receiver unit and the composite field strength is the vector sum of the detected field strengths as derived by taking the square root of the sum of the squares of the field strengths of the signals received by three highly directional equally sensitive antennae oriented with mutually perpendicular axes of maximum sensitivity. Desirably, the three antennae are oriented orthogonally.

In an optimized embodiment, the field strength vector of the signals received by the antennae are time division multiplexed and converted to a DC voltage, and the conversion is effected by a RMS to DC converter. The receiving antennae are of the magnetic loop type, and the transmitting antenna is of magnetic loop type with a split shield. Preferably, the receiving antennae have ferrite cores.

In the preferred embodiment, the transmitter operating frequency is 80 KHz to 15 MHz, and there may be included in the receiver unit a digital state machine or microprocessor to receive and process the output of the detecting means. The receiver unit may also include means for analyzing the composite field strength for a period of time before a warning signal generating means is activated.

DETAILED DESCRIPTION OF PREFERRED EMBODIMENT OF THE INVENTION

Figure 1:
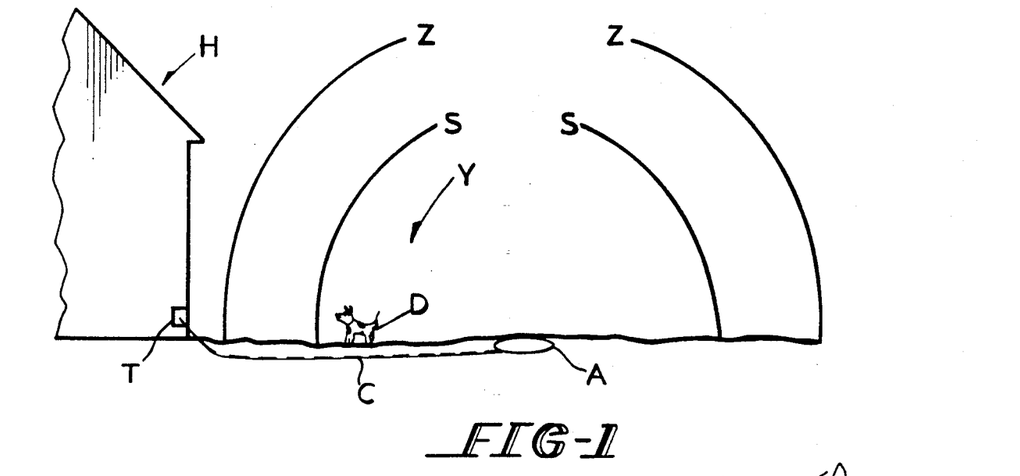
FIG. 1 is a schematic illustration of an environment utilizing an animal restraint application of the present invention.

Referring now in detail to the attached drawings, FIG. 1 is exemplary of an environment in which an animal restraining system embodies the present invention. A house designated H has a yard Y in which a dog D is permitted to roam. The system includes a transmitter T on or within house H having a coaxial cable C leading to an outdoor remote antenna A. The cable C is predominantly or completely underground as may be antenna A. The boundary lines S and Z separate three zones of radiation from antenna A based on radial distance from the antenna.

The system of the present invention comprises the fixed position transmitter T which continuously transmits a radio frequency (RF) signal and a mobile receiver assembly mounted in the collar unit 10 on the dog D. The receiver assembly receives the RF signal and measures the intensity or field strength of the received signal. Since the field strength of the transmitted signal falls off as the distance of the receiver assembly from the transmitter antenna A increases, it is possible to measure the distance from the antenna A to the receiver assembly and dog by measuring the field strength of the transmitted signal at the receiver assembly.

Figure 2:
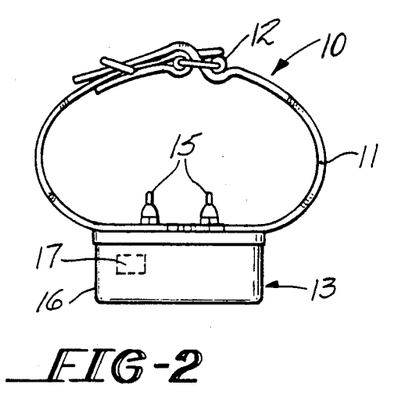
FIG. 2 is a side elevational view of a dog collar unit embodying the receiver assembly of the present invention.

The dog D in FIG. 1 wears a collar unit generally designated by the numeral 10 seen in FIG. 2 which includes a strap 11 having a buckle 12 adapted to be secured about the dog's neck. The collar unit 10 has a receiver assembly generally designated by the numeral 13 disposed within the housing 16, and it has two electrodes 15 thereon which may be utilized for shocking or "zapping" the dog. The housing 16 will generally be suspended at the lower portion of the collar unit 10, i.e., below the dog's neck, and the housing 16 has an opening (or portion transparent to sound) 17 which permits the emission of an audible sound which the dog may hear. Also included within the housing 16 is a receiving system including a plurality of receivers each with an antenna oriented with its axis of maximum sensitivity at a predetermined angle as will hereinafter be described.

In the present invention, the receiver assembly 13 mounted on the dog collar 10 may determine the distance from the antenna A by measuring the received signal strengths at each of its receivers. However, if the orientation of the dog with respect to the transmitting antenna A were allowed to affect the measurement, the dog would not be able to learn what areas of the yard Y are permissible for its movement and what are not, since the signal strength would depend in large measure upon the direction in which the dog was facing, and also upon whether the receiver was on the side, top or bottom of the dog's neck and upon the dog's height.

Moreover, it is additionally desirable that the field pattern projected by the transmitter be uniform in all directions in order that a reasonably predictable circular containment area may be established and that the field pattern provide maximum radial differentiation in order that the radial distance from the transmitting antenna A be accurately and repeatably measurable. "Maximum radial differentiation" means that the field strength should have the largest percentage variation per unit distance from the transmitter. A given level of noise in the system will result in a smaller spatial measurement uncertainty in a system where the field strength changes more rapidly with distance from the transmitter.

Lastly, it is desirable that the transmitter and particularly the receiver should consume minimum power. The receiver assembly 13 mounted on the collar unit 10 of the dog as hereinafter described includes three separate receivers. With this arrangement, the length or strength of a received signal vector B in space with respect to different axes may be measured.

Figure 3:
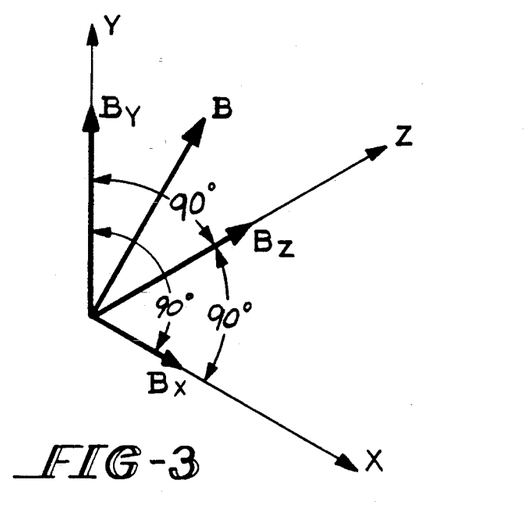
FIG. 3 is a vector diagram depicting the field strength of signals received at several antennae and the derived composite field strength thereof.

FIG. 3 is a vector diagram made up of substantially mutually perpendicular component vectors $B_x$, $B_y$, $B_z$ respectively indicating received field strengths extending along the substantially perpendicular X, Y, and Z axes. The length of the resultant vector B is the square root of $[(B_x)^2+(B_y)^2+(B_z)^2]$. Thus, by measuring the magnetic (electric) field components along each of the axes X, Y and Z of the receivers, information necessary to calculate a total field vector may be derived.

Figure 4:
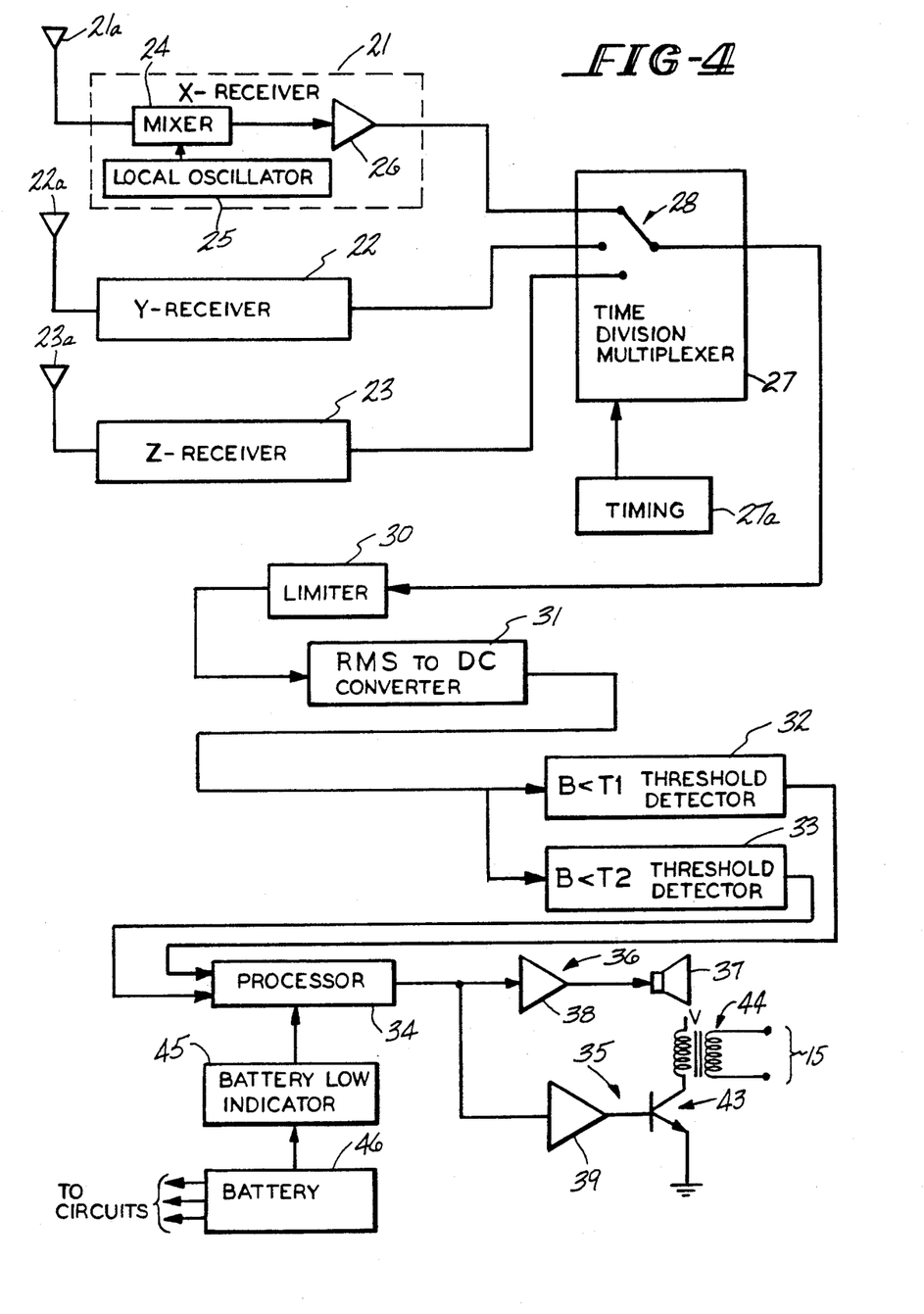
FIG. 4 is a diagram in block and partially schematic form of a receiver assembly embodying the present invention.

FIG. 4 is a block diagram of the receiver assembly 13 as contained within the housing 16 of the collar unit 10 as exemplified in FIG. 2.

As will hereinafter be more fully described, the receiver assembly 13 includes three antennae 21a, 22a and 23a, each of which is highly directional and who's axes of maximum sensitivity are substantially mutually perpendicular (i.e., orthogonal), the antennae are adapted to receive a radio frequency signal from antenna A transmitted from transmitter T at a central point as seen in FIG. 1.

The receiver assembly 13 also includes three receivers 21, 22 and 23 connected to receive the output of antennae 21a, 22a and 23a, respectively. The signals received at the receiving antennae 21 are all from the antenna A.

Each of the antennae 21a, 22a and 23a is preferably of a magnetic loop type wound on a ferrite core. Loop type antennae are preferred because the effective length of the magnetic loop type antenna may be enhanced by winding more turns of the antennae wire on the ferrite core without substantially increasing the physical size of the antenna and because the presence of a conducting object such as an animal does not substantially effect the magnetic field. Each of the antennae 21a, 22a and 23a are highly directional; the X antenna is aligned for maximum sensitivity along the X axis and near zero sensitivity along the Y and Z axes; the Y antenna is aligned for maximum sensitivity along the Y axis and near zero sensitivity along the X and Z axes; and the Z antenna is aligned for maximum sensitivity along the Z axis and near zero sensitivity along the X and Y axes. However, it will be understood that, dependent upon the orientation of the dog, each antenna may pick up transmitted signals of different field intensities. The X, Y, and Z axes are arbitrarily defined but must be mutually perpendicular for the preferred method of composite field strength determination.

As illustrated only with respect to the receiver 21, each of the receivers 21, 22 and 23 apply the received RF signals to the primary inputs of mixers 24 which also receive secondary inputs from the local oscillator 25. The mixers 24 of the several receivers 21, 22, 23 output to an amplifier/filters 26. If so desired, the local oscillator 25 may be common to all receiver mixers 24. Each of the receivers 21, 22, 23 outputs to a time division multiplexer 27 which is shown in simplified form as a three-way switch 28; however, the time division multiplexer 27 operates under the control of a clock 27a as will hereinafter be described. The output of the time division multiplexer 27 is applied to the limiter 30.

As will hereinafter be shown, if the axes of maximum sensitivity of antennae 21a, 22a, 23a are not orthogonal, a set of perfectly orthogonal signals could be derived from a mathematical manipulation of the signals of the non-orthogonal antennae for small perturbations from perfect orthogonality. This mathematical manipulation can be approximated by a linear sum which is easily implemented in analog circuitry as adders and subtractors with different gains. However, in order to reduce circuit complexity, cost, power consumption, and space it is desirable to position the antennae 21a, 22a, and 23a such that their axes of maximum sensitivity (or corresponding planes of minimum sensitivity) are mutually perpendicular, (i.e., a cube corner) so that their output signals in the respective receivers represent an orthogonal vector set.

Each of the receivers 21, 22, and 23 includes a conventional antenna resonance circuit (not shown) followed by the mixer 24, followed by an amplifier-filter 26. The antenna resonance circuitry makes the magnetic loop antenna part of an L-C resonant circuit, tuned to resonate at the chosen operating frequency of the transmitter. This resonator acts as a signal frequency transformer which boosts signal voltage within a narrow band of interest, while also boosting the apparent impedance of the antenna. Thus, the radiation resistance of the antennae appears larger to the mixer's primary input than it would without resonance. This may be viewed as boosting the input signal or increasing the signal to noise ratio for better performance of the system.

The amplifier filter 26 of each receiver provides enough gain of the signal from the mixer 24 so that it may be conveniently acted upon by available lower threshold detecting circuitry as hereinafter discussed. In addition to providing gain, the amplifier-filters 26 act to limit the frequency band width of the system, thereby maximizing the signal to noise ratio. Preferably, the output bandwidth is 200 Hertz or less. Because of the narrow bandwidth and the high signal to noise ratio, the system is highly sensitive and can be made to detect very weak signals.

The output of each of the receivers 21, 22 and 23 is a low frequency sine wave whose amplitude is proportional to the field strength sensed by the particular receiver. These outputs are applied to the time division multiplexer 27 which samples at a rate which is fast compared to both the period of the low frequency sinusoidal receiver output signals and the averaging time constant of the RMS to DC converter 31. The multiplexer 27 may be a conventional 4066 analog multiplexer which is driven by a counter sequencer of a local clock signal, all generally shown by timing block 27a.

Since the sampling time at the time division multiplexer 27, (which may also be referred to as a chopping period) is short compared to the averaging time constant of the converter 31, it is preferable to make the chopping period short compared to the period of the sinusoidal receiver output signals.

The function of converter 31 is to produce a voltage which is proportional to the square root of the sum of the squares of the amplitudes of the sinusoidal outputs of the three receivers 21, 22, 23, which are proportional to the field strengths received at antennae 21a, 22a, and 23a. Such RMS to DC converter chips are commercially available for voltage measuring instrumentation, and a typical chip is that designated AD-537 and made by Analog Devices of Wilmington, Massachusetts.

A limiter 30 is optional and is positioned between the output of the time division multiplexer 27 and the converter 31 to limit any pulse stretching effect of the averaging circuit in converter 31. This may be desirable for increased immunity to burst noise such as that which might be caused by lightning and the like.

The output of the RMS to DC converter 31 is applied to threshold detectors 32 and 33; the threshold detector 32 detects when the vector field strength B (FIG. 3) of the received signal(s) is less than a first threshold $T_1$, while threshold detector 33 detects when the field strength B is less than a second threshold value $T_2$.

If the measured field strength as determined by converter 31 is above both thresholds, the dog is determined to be in what may be referred to as the safe zone (within the boundary S of FIG. 1). If the field strength B falls below the upper threshold $T_1$ but is still above the lower threshold $T_2$, the dog is said to be in a warning zone (the zone between S and Z of FIG. 1). If the field strength signal B falls below both the $T_1$ and $T_2$ thresholds, the dog is said to be in the zap or shock zone (outside boundary Z of FIG. 1).

The outputs of the threshold detectors 32, 33 are applied to a processing network 34 as hereinafter described, and it may generate a signal to a shock or zap circuit 35 having the collar electrodes 15 therein or to an audio beep circuit 36 having an output connected to a electroacoustic transducer 37. Depending upon the detected threshold, the processor 34 will apply signals to audio circuit 36 or shocking circuit 35.

The audio circuit 36 comprises an amplifier 38 which outputs to an audio device 37 such as a piezoelectric beeper. The shocking circuit 35 comprises an amplifier 39, which outputs to a transistor 43 having a flyback transformer 44 in its collector circuit which applies a high shocking voltage to the collar electrodes 15.

The processor 34 also receives an input from a low battery detector 45, which monitors the battery 46 supplying electrical potential to the various circuits of FIG. 4.

Although much of the preceding description has been with respect to an animal restraining system, the radio range finder system of the present invention may be employed for a number of applications. A parallel system is one used for child minding wherein the child carries a receiver which will emit an audible alarm if the child strays beyond the "safe area". Alternatively, the child may carry a small transmitter which functions to generate an alarm at a receiver near the parent. Since both the receiver and the transmitter may be relatively small units, they can be transported for temporary installation during vacations, etc.

Another application is one in which a pair of scuba divers share a system with one carrying the transmitter and the other carrying the receiver. Since the units can be provided in a waterproof enclosure, they may be worn to relatively substantial depths and the receiver may generate an audible or visual signal indicating that the wearer is moving beyond a safe range from his or her "buddy".

Still another type of application is to preclude theft of valuable items. For example, a receiver may be placed within a pocketbook left on a table while the owner is dancing or moving about to other tables. A transmitter incorporated in an item which has of little intrinsic value such as a cigarette box or a spectacle case is also placed on the table. If the pocketbook is merely moved around the table, no alarm is generated, but, if someone takes the pocketbook from the table, an audible alarm is generated by the receiver in the pocketbook.

Various other applications involving measurement of the range from the transmitter to the receiver may employ this technology for safety or theft prevention applications, as well as for various other types of applications where it is desired to utilize some control over the spacing of two moving or one moving and one-fixed location.

For short distance applications between two movable objects such as a woman and her purse or two scuba divers, it is not practical to have the type of transmitter antenna geometry used for the animal restraining or child minding system. A smaller antenna is desirable for such a fully portable system, and the range required for such a system is relatively short such as twenty feet for scuba divers and probably not more than about six feet for protecting a purse or the like. It would be possible for such an application to use a small transmitter antenna with a ferrite core in place of the eighteen inch air core loop antenna which is preferred for the fixed installation in the animal restraining system.

Figure 6A:
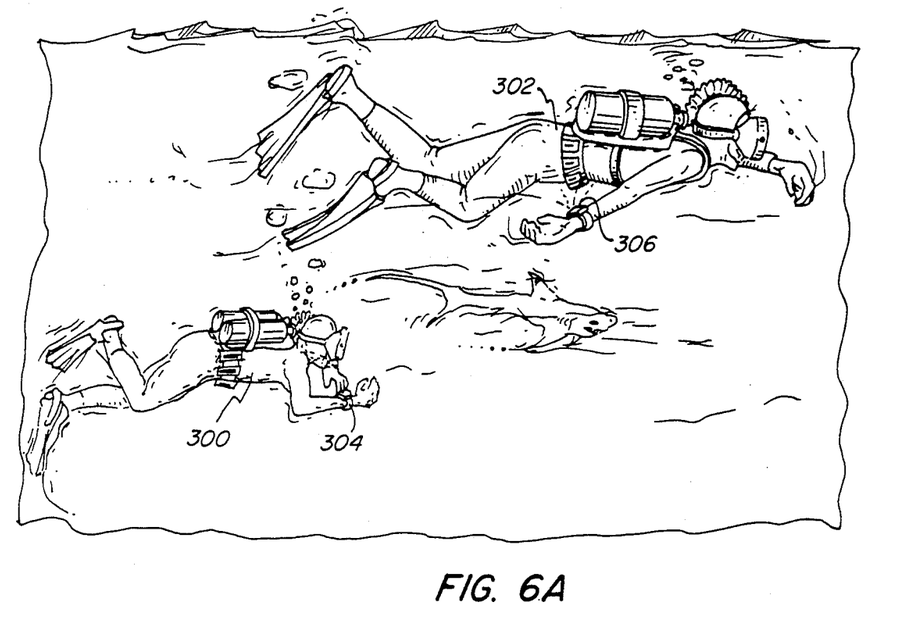
FIGS. 6a and 6b are schematic illustrations of the other applications utilizing the system.
Figure 6B:
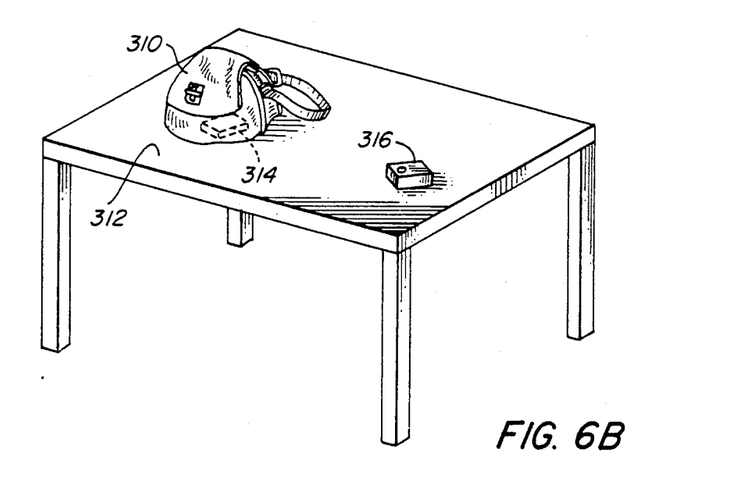

Turning specifically to FIGS. 6a and 6b, there are diagrammatically illustrated two additional systems which employ the present invention.

In FIG. 6a, the diver 300 carries a transmitter 304 on a wrist band and the diver 302 carries the receiver 306 on an wrist band. The receiver 306 generates a signal indicative of the distance between the two divers and will warn diver 302 in the event that this distance become excessive. Generally scuba divers who are functioning as buddies should stay within twenty feet of each other when the visibility is reasonably good and within five to ten feet of each other if the visibility is poor.

In FIG. 6b, the purse 310 is left upon the table 312 and contains a receiver 314. Also placed upon the table 312 is a "cigarette pack" 316 which in reality is a small transmitter, and this pair functions as a range finding system in accordance with the present invention. So long as the purse 310 stays within a prescribed distance of the transmitter 316, (eg., five feet), no signal is emitted. However, if the purse 310 is removed from the table 312 while the transmitter 316 is still actuated and the distance between them exceeds the predetermined amount, a loud audible alarm is generated by the receiver.

Figure 5A:
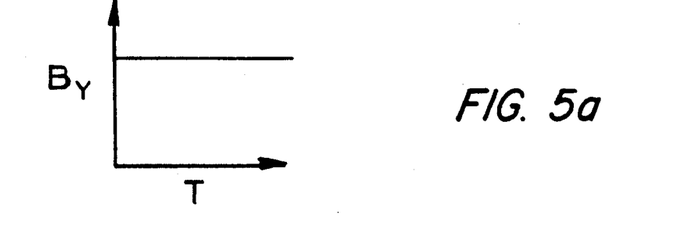
FIGS. 5a–5e are diagrams in graphic form of received and derived signals plotted with respect to time.
Figure 5B:
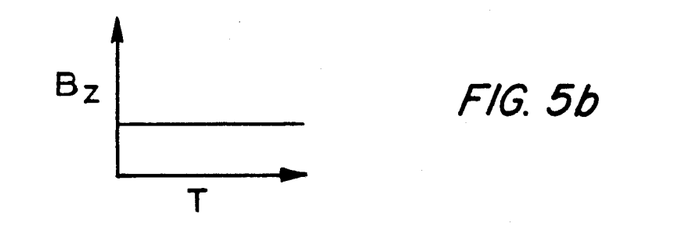
Figure 5C:
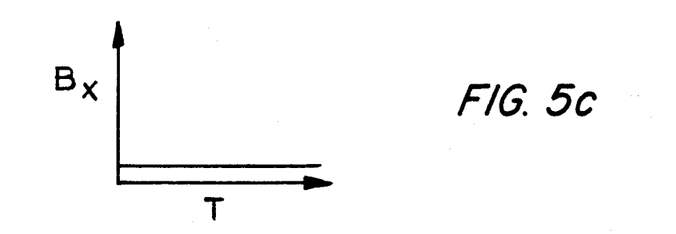
Figure 5D:
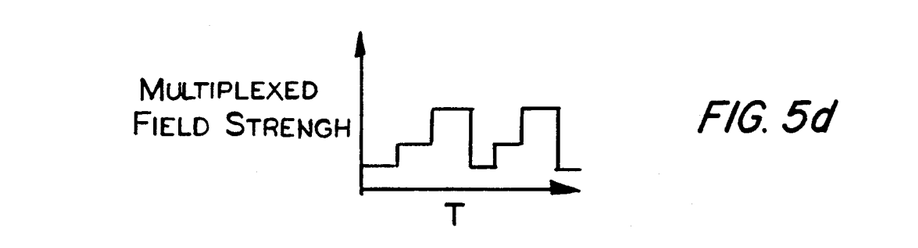
Figure 5E:
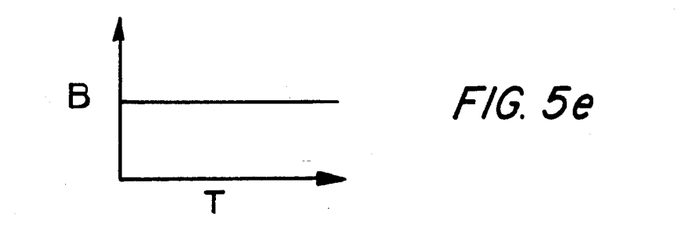

Turning now to FIGS. 5a-5e, these show various example wave forms which might occur in the receiving system of FIG. 4, and they should also be considered in conjunction with the vector diagram of FIG. 3. FIG. 5a represents the field strength $B_y$ of the RMS signal received at antenna 22a of the receiver 22; FIG. 5b represents the field strength of the signal received at antenna 23a of the receiver 23; and FIG. 5c represents the field strength of the signal received at antenna 21a of receiver 21. FIG. 5d depicts the output of multiplexer 27 as it sequentially samples the outputs of the receivers in the order of X, Z, and Y. FIG. 5e depicts the signal B from converter 31 which is indicative the square root of $$[(B_x)^2+(B_y)^2+(B_z)^2]$$

and gives a measure of the distance of the receiver assembly 13 of FIG. 2 (the components of which are detailed in FIG. 4) from the transmitting antenna A of FIG. 1.

Although it is preferable that the three antennae 21a, 22a and 23a have orthogonal sensitivities, (i.e., mutually perpendicular), this is not absolutely necessary. As previously pointed out, the resultant vector B may be derived as the square root of the sum of the squares of the orthogonal component field strengths. Assuming that the received field strengths at the receiving antennae are not each proportional to only one of the component vectors $B_x$, $B_y$ and $B_z$, but have some sensitivity to the other components of the field, then three equations in three unknowns can be expressed in three equations:

$$A_x = C_{xx}B_x + C_{xy}B_y + C_{xz}B_z$$

$$A_y = C_{yx}B_x + C_{yy}B_y + C_{yz}B_z$$

$$A_z = C_{zx}B_x + C_{zy}B_y + C_{zz}B_z$$

wherein the Cs are constants, A is the signal from the antenna (non-orthogonal) and B is the derived (orthogonal) component vector. These equations can be solved for the vectors $B_x$, $B_y$ and $B_z$ (FIG. 3), and the resultant field vector B can then be derived as the square root of the sum of the squares of the derived component vectors $B_x$, $B_y$ and $B_z$.

The processor 34 contains various timing circuits for determining elapsed time with regard to the location of the animal with respect to the antenna A.

The system of the present invention is designed to provide a uniform circular field pattern with respect to the transmitting antennae A, good radial accuracy, and minimum interference from objects in close proximity to the receivers. This is achieved by selection of the wave length or equivalently the frequency at which the transmitter operates. If a short wave length (e.g., 49 MHz which has a wavelength of about 6.1 meters) is utilized, then common objects may act as resonators and distort the field strength pattern. Any conducting object with any dimension on the order of a quarter of a wave length or more may act as some form of significant RF resonator or reflector to the transmitted wave. For example, at a transmitting frequency of approximately thirty Megahertz or more, a person or a dog may act as a significant resonator and significantly distort the field. Thus, the orientation of a movable object to which the receiver may be attached may significantly affect the field strength of the received signals. The presence of conducting objects including people near the receiver significantly affects the field strength of the signal at the receiver. Thus, at a selected relatively high frequency and even if there is a perfect field strength measuring receiver, it is not always possible to tell unambiguously how far the receiver is from the transmitter without knowing the orientation of the object or animal to which the receiver is attached, and who and what happens to be near the receiver.

This problem may be obviated by operating the system at a much lower frequency (longer wavelength). For example, if a frequency of approximately one Megahertz is used, the wave length is on the order of approximately one thousand feet so that even objects like a house do not drastically distort the field, and common movable objects have virtually no effect on the field. Even more importantly, the orientation of a movable object on which the receiver may be mounted has no significant effect on the field.

In order to be able to sharply differentiate one distance (from the transmitter) from another, it is desirable to have the field strength fall off sharply in the region where one wishes to make a distinction (for instance, between "child is safe", and "child is in danger"). In the far field of any radio frequency transmitter, both the electrical and magnetic field strengths fall off at the rate of 1/r, where r is the radial distance from the transmitter. In the near field, however, the magnetic and electric fields fall off more sharply. If the source of the field (i.e., the transmitter antenna) is a magnetic dipole, (i.e., loop-type antenna) then the magnetic field falls off as $1/r^3$ in the near field, and the electric field falls off as $1/r^2$. If the source of the field (i.e., the antenna) is an electric dipole, then the magnetic field falls off as $1/r^2$ in the near field, and the electric field falls off as $1/r^3$. In either case, these values fall off until they become coincident with the $1/r$ strengths of the far field at the near-to-far-field transition radius, which occurs at a radius of $$\frac{1}{2\pi}$$

wavelengths from the transmit antenna.

Since the $1/r^2$ field and $1/r^3$ field both are much more sharply differentiated in space than a $1/r$ field, they will give the system better accuracy in the presence of noise. Therefore, it is preferable that the wavelength used be not only long enough that objects such as people and dogs do not perturb the field, but also long enough that the proposed boundary be within the near field, making the boundary more accurately defined and repeatable. Once again, an exemplary frequency of 1 MHz is well suited, since the near-to-far-field transition radius is about 157 feet, and the preferred system is designed to work at a distance of up to about 100 feet.

The desirable operating frequency is chosen as a function of the desired control radius, and is normally in the range of 80 KHz to 20 MHz. The boundary becomes between 2 and 3 times less accurate when the wavelength is less than $2\pi$ times the control radius. Thus, for a system designed for a control radius of 20 to 200 feet, the optimum operating frequency would range between 800 KHz and 8 MHz. If the operating frequency goes above 10 MHz, the performance of ferrite core loop antennas begins to degrade. If the operating frequency falls below about 70 kHz, either the input power to the transmitter becomes inconveniently large or the size of the transmit antenna becomes inconveniently large. The overall desired operating frequency is thus between 70 kHz and 20 MHz.

Ideally, the receiver unit would contain an antenna which was equally sensitive to all orientations of the field. Unfortunately, such a totally omni-directional antenna is not feasible, and real life antennas are often quite directional. Through the use of multiple highly directional antennae, the present invention implements a true omni-directional field strength measuring device.

One may visualize the electric and magnetic field lines of radio waves as field lines moving perpendicularly to their axes through space. An electric dipole antenna may be used to sense the electric field lines, or a magnetic dipole (loop) antenna may be used to sense the magnetic field lines. In the case of the electric dipole antenna, it is most sensitive when perfectly aligned with the electric field lines, and has no response if aligned perpendicular to the electric field lines. In the case of the magnetic dipole (loop) antenna, it has maximum sensitivity when aligned so that the magnetic field lines are parallel to the axis of the loop, and it has no response to magnetic field lines aligned perpendicularly to the axis of the loop.

Simply linearly combining the outputs of multiple antennae does not solve the directionality problem, because there will always be some combination of field strengths in different directions at different phases that will cause a zero output from the combined antenna, although the total field strength is far from zero.

If it is desired to measure the strength of a field line in space although its orientation is unknown, the strength of the field line may be considered as the length of a vector pointed along the field line. Any vector may be considered in Cartesian coordinates as the sum of three mutually perpendicular component vectors, referred to as the x vector (of length $B_x$), the y vector (of length $B_y$), and the z vector (of length $B_z$), as illustrated in FIG. 3. The length of the total vector is the square root of $[(B_x)^2+(B_y)^2+(B_z)^2]$. This is a geometric concept which is independent of the orientation in space which is chosen to set up the coordinate system so long as our chosen x, y and z axes are mutually perpendicular, i.e., orthogonal. Thus, one may choose any mutually perpendicular x, y and z axes and, if the magnetic (or electric) field component is measured along each of these axes, the information is provided to calculate the total field.

Thus, the receiver assembly of the present invention desirably uses three highly directional receivers (one sensitive only to the X-oriented field, one sensitive only to the y-oriented field, and one sensitive only to the z-oriented field). A signal proportional to the square root of the sum of the squares of their respective received signal strengths is derived. By using three highly directional receivers, with their outputs nonlinearly combined it appears as though a totally omni-directional antenna were being employed.

As will be appreciated, the electric field is more sharply differentiated in the near field of an electric dipole transmit antenna and the magnetic field is more sharply differentiated in the near field of a magnetic dipole transmit antenna. In order to obtain maximum radial differentiation and accordingly maximum accuracy and repeatability, it is desirable to use an electric dipole receive antenna if an electric dipole transmit antenna is used, and a magnetic loop receiving antenna as previously described if a magnetic loop transmit antenna is used. Although unlike antennae may be used in the transmitter and receiver, the accuracy and repeatability will be slightly degraded.

Loop-type antennae are used because the effective length of a magnetic-loop type antenna may be increased by winding more turns on the antenna coil, without substantially increasing the physical size of the antenna, and because the transmitted magnetic field is not disturbed by objects such as animals or people, whereas the electric field is. Each of these antennae is highly directional. The X antenna is aligned for maximum sensitivity along the X axis (and near zero sensitivity along the Y and Z axes). The Y antenna is aligned for maximum sensitivity along the Y axis (and near zero sensitivity along the X and Z axes). The Z antenna is aligned for maximum sensitivity along the Z axis (and near zero sensitivity along the X and Y axes). The X, Y and Z axes are all mutually perpendicular.

If the sensitivity of the antennae were not perfectly orthogonal, a set of perfectly orthogonal signals could be derived from a mathematical manipulation of the signals from the not-perfectly-orthogonal antennae. For small pertubations from perfect orthogonality, this mathematical manipulation can be well approximated by a linear sum, which is easily implemented in analog circuitry as adders and subtracters with different gains. However, in order to reduce circuit complexity, cost, power consumption and space, it is desirable to position the antennae so that their output signals already represent an orthogonal vector set. For any application which would require a higher degree of accuracy in the alignment of the antennae, summing circuitry with potentiometrically variable coefficients may be used to give final precise tweaks to derive more perfectly orthogonal components. This is not deemed necessary for the presently envisioned applications.

For fixed transmitter applications (such as child minding or dog training), it is desirable to minimize or avoid the potential for the radiated RF signal to follow the cable C to the house and thence through the power lines. A magnetic loop type transmit antenna is preferred because it has an electric dipole field at the antenna which is much smaller, and the electric field guided back to the house is also smaller. With such a system, it is possible to have a field pattern which is warped by only a few feet under or over the power lines.

However, a magnetic loop antenna still has an electric dipole moment since it may be pictured as an inductor with a radio frequency AC voltage on it. Since the antenna acts as an inductor, there is a continuously distributed voltage drop across the coil. If the antenna were only one turn, the voltage at a point half way about the circumference would vary at half the amplitude of the voltage being applied to the one turn of wire. Since the coil has a diameter L, this point with the varying voltage is at a distance L, from the ground shield of the cable, so the antenna may be regarded not only as a magnetic loop antenna, but also as a (simultaneous) electric dipole antenna of a length L. As in the case of the single-ended electric dipole antenna, significant energy is guided back to the house by the cable, and undesirable coupling to the utility lines can occur.

The loop antenna cannot simply be encased in a shield because it would source no magnetic field, and it would not transmit. A split shield allows the antenna to source magnetic field, but also significantly reduces electric field.

Figure 7:
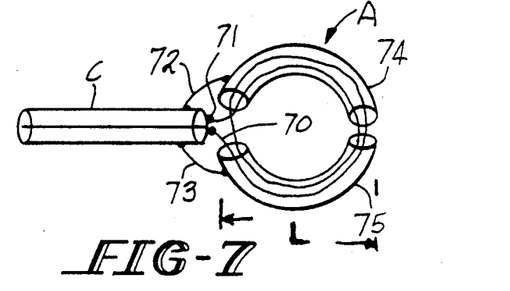
FIG. 7 is a partially diagrammatic illustration of the transmitting antenna of FIG. 1.

To provide a well defined area, it is preferable that the transmitter antennae transmit a uniform circular field pattern suitable, for example, for maintaining a dog within a given radial distance of the antenna. The split shield magnetic loop antenna as shown in FIG. 7 is designed to provide minimum coupling to utility lines and a uniform circular field pattern with respect to the transmitting antennae A, good radial accuracy, and minimum interference from objects in close proximity to the receivers. This also requires selection of a desirable wave length or frequency of the signal generated by the transmitting antennae A.

In an exemplary fixed-position transmitter application, the transmitter antenna A is connected to coaxial cable C from (FIG. 1) the transmitter T. The conductor 70 of the loop antenna A is connected to the shield of cable C at point 71. The loop 70 of the antenna A has two spaced substantially semi-circular shields 74 and 75 which are connected to the shield of cable C as exemplified by lines 72 and 73.

As seen, the two shields 74 and 75 each run almost half way around the loop coil (to the side opposite from where the cable C connects), but they do not meet on the other side and a gap is left intentionally. Were the gap not there, the split shields would form a shorted loop, and this would cancel out the magnetic field the antenna is trying to source. Since the shields do not meet, no loop current flows in them, so they have minimal interaction with the magnetic field intended to be sourced. However, they are electrically connected to ground. Since no significant currents flow in the shields, they do not have much inductance voltage drop, and they remain close to ground potential. This nearly cancels the electric dipole moment of the loop antenna, and the minute electric dipole moment that comes from the gap in the shield is insignificant and can be ignored. The split-shield loop antenna has been tested and no safe zone was found near power lines, provided good isolation techniques were used to keep the transmitter circuit from coupling directly to the utility through its power cord.

This configuration provides an antenna which is of the magnetic loop type but substantially cancels any electric dipole effect and coupling of the loop to the utility power lines. This antenna provides a uniform transmitted field pattern which defines the area of restraint of the animal. The conductor of antenna A is insulated in a suitable jacket for underground installation.

Each receiver consists of antenna resonance circuitry, followed by a mixer, followed by an amplifier-filter. The antenna resonance circuitry makes the magnetic loop antenna part of an L-C resonant circuit, tuned to resonate at the chosen operating frequency of the system. This resonator acts as a single-frequency "transformer" which boosts signal voltage within the narrow band of interest, while also boosting the apparent impedance of the antenna. The radiation resistance of the antenna appears much larger to the input electronics than it would without the resonance. This may be viewed as boosting the input signal or increasing the signal-to-noise performance of the system. Since the receiver circuitry should consume very little power, and since incremental input impedance of bipolar transistor circuitry generally increases as operating currents decrease, the input impedance of the first stage of the electronics (in this case, the mixer) of a very low-power system is generally very high.

If the input resistance of the input stage is larger than the output resistance of the antenna, the noise of the system will be dominated by the input electronics, which is a waste. In order to derive the best signal-to-noise performance, it is desirable to transform the antenna impedance until it is on the order of the input impedance of the electronics. The lower the power of the circuitry, the more the antenna impedance should be boosted by the input resonator.

Following each input resonator is a fully balanced mixer, with an integral RF gain of 40. The mixer is implemented as a Gilbert Cell, which multiplies the (RF) input from the antenna resonator by a periodic waveform generated by the local oscillator. This multiplication process translates the band of the input frequency information which is around the frequency of the local oscillator down to baseband. Thus, if the difference between the local oscillator frequency and the transmitter frequency were 10 Hz, the output of the mixer would include a 10 Hz sine wave. The output of the mixer is very broad band, and it contains many frequencies not of interest. The closer the frequency of the local oscillator can be held to the transmitter frequency, the more the unneeded bandwidth can be rejected. Narrowing the bandwidth of the receiver is desirable because the background noise in a narrow region of the AM broadcast band (which is the frequency range in which the unit desirably operates) can be considered to be spectrally flat, and thus the signal-to-noise ratio increases as the bandwidth decreases.

If position determination is required within a tenth of a second, the measurement bandwidth must be on the order of 3 Hz. If the dog is moving around, the received signal is changing in amplitude: this is inherently an amplitude modulation, and it will have the frequency spectrum of an amplitude modulation.

The minimum acceptable bandwidth for the receiver is on the order of 6 Hz, but implementation dependent factors may require the bandwidth to be even wider. First, the temperature of the receiver may vary over quite a wide range, depending on the environment of the dog (snow, sun, etc.). The design temperature range for the system under consideration is 0° F. to 120° F. Standard AT cut quartz crystals drift about 50 parts per million over this temperature range, so that even if the local oscillator is a good quartz oscillator, it will require an additional 50 Hz bandwidth for the receiver. Producing an economical low power oscillator will result in even more drift, resulting in a bandwidth on the order of twice as wide. A low-cost unit employing a low-power crystal oscillator will require about 100 Hz bandwidth at the receiver. Using phase locked loop to track transmitted carrier frequency would allow a narrower receive bandwidth than a non-tracking oscillator. Such performance was not deemed necessary for the system under consideration, but should be considered within the scope of the invention. Temperature compensation of the oscillator for improved performance is also to be considered within the scope of the present invention.

The amplifier filter circuit should provide enough gain to the signal so that it may be conveniently acted upon by commonly available low-power threshold detecting circuitry (for example, low power comparators or Schmitt Trigger circuits). In addition to providing gain, this circuitry acts to limit the frequency bandwidth of the system, thereby maximizing the signal-to-noise ratio. Because of the narrow bandwidth and high signal-to-noise ratio, the system is highly sensitive, and it can be made to detect very weak signals.

In order to prevent undesirable feedback oscillation, it is desirable to frequency-shift the signal between successive blocks of amplification, so that, even if the signal couples back, it will couple back at the wrong frequency to make any difference. This is the practice used in common superheterodyne radio receivers. Another technique which can be employed to reduce such coupling is differential amplification, so that only the difference between two signals is amplified. If a stray signal is fed back almost equally to the two inputs, the difference signal which results across the inputs will be small and the system will have a high common mode rejection.

The Gilbert Cell mixers used in the receivers of the receiver unit employ both of these techniques. Because the Gilbert Cell has a differential input, any signal that feeds back equally to both sides of an antenna will not be picked up. In addition, the Gilbert Cell mixers give a gain of 40 to the RF signal picked up by the antenna before translating the signal down to baseband.

Ignoring the noise present (which is valid if the signal-to-noise ratio is high), the output of each receiver is a low frequency sine wave with an amplitude proportional to the field strength sensed by that particular receiver. Through more complicated means (in-phase and quadrature demodulation, for example), it would be possible to derive DC representations of the x, y, and z field strengths, but this is unnecessary in the present design, because the RMS-to-DC converter can perform its mathematical job almost as well on chopped sine waves as on chopped DC (provided the period of the sine waves is short compared to the averaging time constant of the RMS-to-DC converter). The DC levels of $B_x$, $B_y$, and $B_z$ may be thought of as representative of the amplitudes of the actual sine waves at those points in the circuit.

The time division multiplexer samples the output signals from the three receivers at a rate which is fast compared to both the period of the sine wave signals themselves, and the averaging time constant of the RMS-to-DC converter. The sampling must be either fast or slow compared to the frequency of the sine waves, or significant aliasing can occur, which can result in significant sinusoidal variations in the derived field strength signal at the output of the RMS-to-DC converter. Since the sample time of the time division multiplexer (also referred to as the chopping period) must be short compared to the averaging time constant of the RMS-to-DC converter (in order to avoid output ripple), it is desirable to make the chopping period short compared to the period of the sinusoidal receiver output signals as well.

Two threshold detectors serve to determine which of three zones of interest the dog is in: the safe zone, the warning zone, or the zap zone. If the measured field strength is above both thresholds, the dog is said to be in the safe zone. If the signal falls below the upper ($T_1$) threshold, but is still above the lower ($T_2$) threshold, the dog is said to be in the warning zone. If the field strength signals falls below both the $T_1$ and $T_2$ thresholds, the dog is said to be in the zap zone. The outputs of the $T_1$ and $T_2$ threshold detectors may be considered to be digital. As previously indicated, these digital signals are fed to a microprocessor (or equivalent digital circuitry capable of implementing a suitable warning algorithm).

As will be readily appreciated, the circuitry for the collar unit may be fabricated relatively easily from readily available components and in miniaturized form. Moreover, the components may be selected so that they require minimal power to enable relatively long-lived operation on the incorporated battery. The transmitter may be of conventional construction as may be the coaxial cable and the modified split ring antenna.

To assemble the system in any given location, it is necessary only to connect the transmitter to a suitable power source, run the cable to the center of the region in which the dog or other animal is to be restrained, and locate the antenna preferably below ground. The battery condition indicator enables the owner to determine when the battery should be replaced to ensure continued operation.

The preferred circuitry and algorithms are designed to avoid creating an impediment to the return of the dog to the safe area since no zapping or beeping will occur during such return.

Although the illustrated embodiment uses three receivers with highly directional antenna disposed orthogonally, other antenna configurations may be employed albeit with greater complexity for the mathematical derivation of the composite field strength of the field strengths of the component antennae.

The transmitting antenna will most usually and desirably be a separate element in order to achieve optimum results. However, it is also possible to make the antenna an integral part of the transmitter such as an inherent part of the transmitter oscillator. As used herein, the transmitter antenna may be separate or integrated except as otherwise described. In addition, it is understood that multiple transmitting antennae may be employed to produce safe zones with other than a circular shape.

Moreover, the transmitter may be located within the confines of the protected zone as well as outwardly thereof as shown in the illustrated embodiments. If located within the area, it should be protected from the environment as well as the restricted animal.

Although the receiver assembly has been illustrated as mounted on a collar, it will be appreciated that the unit could be worn by the animal in other forms such as a belt, helmet or cap, bracelet, or other article which may be placed in a secure fashion on the animal.

Although the restraining system of the present invention has been described in detail with respect to a dog, it will be appreciated that it may also be employed with other animals such as horses and cats. Moreover, it may also be employed to restrict movement of children and mentally ill persons, or to assist in confining persons in home confinement programs. For applications to humans, the types of warning signals generated by the receiver would be modified appropriately. The term "animal" as used herein is intended to encompass humans as well as domesticated and other animals.

The receiver unit may contain various types of output means for providing an indication of the detected composite field strength, and this may be visual such as a meter or a series of indicators illuminated at different field strengths. It may also be audible such as a whistle or horn, and this may be intermittent, or continuous and vary in intensity or frequency with the strength of the signal. In another embodiment, it may be an electrical pulse to provide a stimulus to a person carrying the receiver unit. The preferred output indication means will depend upon the application for the system, and combinations may be used.

The system may also be used as a warning device to act when the receiver unit is approaching a transmitter to indicate a danger zone.

For safety system such as a scuba diver system, the output is conveniently an audio signal to an earphone worn by the diver. In such a system, the distance could be indicated as a continuously variable beep rate or tone so that the diver carrying the receiver would have a continuous awareness of how far he or she was from the dive buddy. However, such continuous audio signals may be preferable for some applications but disconcerting for other applications.

Thus, it can be seen from the foregoing detailed specification and attached drawings, that the animal retraining system of the present invention is simple in construction and reliable in operation. The microprocessor contained within the collar unit is adapted to process rapidly the information from the receivers to determine what signals, if any, are required to be generated, and to avoid the undesirable aspects of unlimited warning signals.

Having thus described the invention, what is claimed is:

1. A radio range finding system comprising:
   (a) a radio frequency transmitter for generating a radio signal of a selected frequency and adapted to be disposed in or adjacent an area in which distance is to be monitored;
   (b) a transmitting antenna operatively connected to said transmitter for radiating said radio frequency signal generated by said transmitter; and
   (c) a receiver unit adapted to be disposed within said area and comprising:
     (i) a multiplicity of radio signal receivers each having a receiving antenna with said receiving antennae of said multiplicity of receivers having their axes of maximum sensitivity oriented in different directions and each operative to receive signals of said selected frequency;
     (ii) means for deriving a composite field strength based upon the field strengths of said radio signal generated by said transmitter and received by all of said receiving antennae; and
     (iii) means for providing an output indication of composite field strength based upon said composite field strength derived from said signal detected by said receiving antennae.

2. A radio range finding system in accordance with claim 1 wherein said output indication means provides an output which varies with the strength of said composite field strength.

3. A radio range finding system in accordance with claim 1 wherein said output is an audible signal.

4. A radio range finding system in accordance with claim 1 wherein said receiver unit includes means for detecting when the composite field strength of said means falls below a predetermined value and wherein said output indication means in said receiver unit is responsive thereto and generates a perceptible signal.

5. A radio range finding system in accordance with claim 1 wherein there are at least three receivers in said receiver unit.

6. A radio range finding system in accordance with claim 1 wherein there are three receivers in said receiver unit and said composite field strength is the vector sum of the detected field strengths as derived by taking the square root of the sum of the squares of the field strengths of the signals received by three highly directional equally sensitive antennae oriented with mutually perpendicular axes of maximum sensitivity.

7. A radio range finding system in accordance with claim 6 wherein said three antennae are oriented orthogonally.

8. A radio range finding system in accordance with claim 1 wherein the field strength vector of the signals received by said antennae are time division multiplexed and converted to a DC voltage.

9. A radio range finding system in accordance with claim 8 wherein said conversion is effected by a RMS to DC converter.

10. A radio range finding system in accordance with claim 1 wherein said receiving antennae are of the magnetic loop type.

11. A radio range finding system in accordance with claim 10 wherein said transmitting antenna is of magnetic loop type with a split shield.

12. A radio range finding system in accordance with claim 10 wherein said transmitting antenna is of magnetic loop type and said receiving antennae have ferrite cores.

13. A radio range finding system in accordance with claim 1 wherein said detecting means detects when the composite field strength falls below first and second predetermined values.

14. A radio range finding system in accordance with claim 1 wherein the transmitter operating frequency is in the range of 80 KHz to 20 MHz.

15. A radio range finding system in accordance with claim 1 wherein there is included in said receiver unit a microprocessor to receive the output of said detecting means.

16. A radio range finding system in accordance with claim 1 wherein said receiving antennae are highly directional.

17. A radio range finding system comprising:
(a) a radio frequency transmitter for generating a radio signal of a selected frequency and adapted to be disposed in or adjacent an area in which distance is to be monitored;
(b) a transmitting antenna operatively connected to said transmitter for radiating said radio frequency signal generated by said transmitter;
(c) a receiver unit adapted to be disposed within said area and comprising:
(i) three radio signal receivers each having a highly directional receiving antenna with said receiving antennae of said multiplicity of receivers having their axes of maximum sensitivity orthogonally oriented and each operative to receive signals of said selected frequency;
(ii) digital processing circuitry;
(iii) means for determining a vector sum of the field strengths of said radio generated by said transmitter and received by all of said receiving antennae, said vector sum of the detected field strength of said signals received by said antennae being derived from the square root of the sum of the squares of the field strengths of said signal as received by the three receivers;
(iv) means for detecting when the vector sum of field strengths detected by said receivers falls below a predetermined value; and
(v) signal generating means in said unit for generating a signal, said signal generating means being actuated when the detected vector sum of said field strengths falls below said predetermined value.

18. The radio range finding system in accordance with claim 17 wherein the field strength signals from said receivers are time division multiplexed and converted to a DC voltage.

19. The radio range finding system in accordance with claim 18 wherein said conversion is effected by a RMS to DC converter.

20. The radio range finding system in accordance with claim 17 wherein said transmitting and receiving antennae are of the magnetic loop type, wherein said receiving antennae have ferrite cores, and wherein said magnetic loop transmitting antenna has a split shield.

21. The radio range finding system in accordance with claim 17 wherein the operating frequency is in the range of 80 KHz to 20 MHz.

22. A radio signal field strength analyzer operable to analyze the field strength of a signal of a single frequency emanating from a common transmitter as received by a multiplicity of receivers comprising:
(a) at least three radio signal receivers each having a receiving antenna with said receiving antennae of said receivers having their axes of maximum sensitivity oriented in different directions, said receivers all operating at the same frequency; and
(b) means for deriving a composite field strength based upon the field strengths of the radio signals of the same frequency received by all of said receiving antennae, said composite field strength being the vector sum of the detected field strengths as derived by taking the square root of the sum of the squares of the field strengths of the signals received by three highly directional equally sensitive antenna oriented with mutually perpendicular axes of maximum sensitivity.

23. A radio signal field strength analyzer in accordance with claim 22 wherein the field strength vector of the signals received by said antenna are time division multiplexed and converted to a DC voltage and wherein said conversion is effected by an RMS to DC converter.

24. A radio signal field strength analyzer in accordance with claim 22 wherein said three antenna are oriented orthogonally.

25. A radio signal field strength analyzer in accordance with claim 22 wherein receiving antennae are of the magnetic loop type and having ferrite cores.

26. In a radio signal field strength analyzer comprising:
(a) means for detecting at least three component radio signals of independent field strength; and
(b) means for deriving a composite field strength based upon the field strengths of said radio signals received, said composite field strength being the vector sum of the detected field strengths as derived by taking the square root of the sum of the squares of the field strengths of the signals received by three highly directional equally sensitive antennae oriented with mutually perpendicular axes of maximum sensitivity, said deriving means including means functioning to time division multiplex and convert to a DC voltage the field strength vector of the signals received by said antennae, said conversion being effected by an RMS to DC converter.

* * * * *